United States Patent [19]
Newman et al.

[11] Patent Number: 5,599,004
[45] Date of Patent: Feb. 4, 1997

[54] APPARATUS FOR THE INJECTION OF CABLE INTO COILED TUBING

[75] Inventors: Kenneth R. Newman, Willis; Lyndon Stone, Humble; David Tong, Conroe, all of Tex.

[73] Assignee: Coiled Tubing Engineering Services, Inc., Contoe, Tex.

[21] Appl. No.: 354,646

[22] Filed: Dec. 13, 1994

Related U.S. Application Data

[63] Continuation-in-part of Ser. No. 272,021, Jul. 8, 1994, Pat. No. 5,503,370.

[51] Int. Cl.⁶ .................................................. E21C 29/16
[52] U.S. Cl. .......................... 254/134.3 FT; 254/134.4; 254/134.3 R
[58] Field of Search .................... 166/77; 254/134.3 FT, 254/134.3 R, 134.4; 226/25, 43, 178, 97; 15/104.06

[56] References Cited

U.S. PATENT DOCUMENTS

| | | |
|---|---|---|
| 2,630,180 | 3/1953 | Summers . |
| 2,677,427 | 5/1954 | McKinney et al. . |
| 2,720,266 | 10/1955 | Broussard et al. . |
| 2,810,439 | 10/1957 | McCullough . |
| 3,190,616 | 6/1965 | Oleson . |
| 3,837,624 | 9/1974 | Dandurand ........................... 254/134.4 |
| 3,866,679 | 2/1975 | Laky . |
| 3,920,076 | 11/1975 | Laky . |
| 4,091,867 | 5/1978 | Shannon, Jr. et al. . |
| 4,456,225 | 6/1984 | Lucas ............................. 254/134.3 FT |
| 4,529,148 | 7/1985 | Hesprich et al. . |
| 4,542,787 | 9/1985 | Parker . |
| 4,850,569 | 7/1989 | Griffioen et al. . |
| 5,029,816 | 7/1991 | Langston . |
| 5,046,674 | 9/1991 | Kolschbach et al. ................. 254/134.4 |
| 5,123,075 | 6/1992 | Renton ................................ 254/134.4 |
| 5,143,353 | 9/1992 | Sano et al. ........................... 254/134.4 |
| 5,188,173 | 2/1993 | Richardson et al. . |
| 5,211,377 | 5/1993 | Griffioen et al. ..................... 254/134.4 |
| 5,308,041 | 6/1994 | Griffioen et al. . |
| 5,324,006 | 6/1994 | Pickrell .......................... 254/134.3 FT |

FOREIGN PATENT DOCUMENTS

| | | |
|---|---|---|
| 0565287A1 | 10/1993 | European Pat. Off. . |
| 0681353A1 | 11/1995 | European Pat. Off. . |
| 2288837 | 11/1995 | United Kingdom . |

*Primary Examiner*—Robert C. Watson
*Attorney, Agent, or Firm*—Gunn & Associates, P.C.

[57] ABSTRACT

A method and apparatus for the installation of cable into a reel of coiled tubing includes a cable injector. The cable injector comprises a capstan drive within a pressure housing. In a preferred embodiment, the capstan comprises a drive wheel that is enclosed within the pressure housing and the pressure housing is made up of a pair of seal plates or flanges with a seal ring between them. A drive shaft penetrates one of the flanges. This arrangement minimizes the size of a rotating seal in the pressure housing.

10 Claims, 7 Drawing Sheets

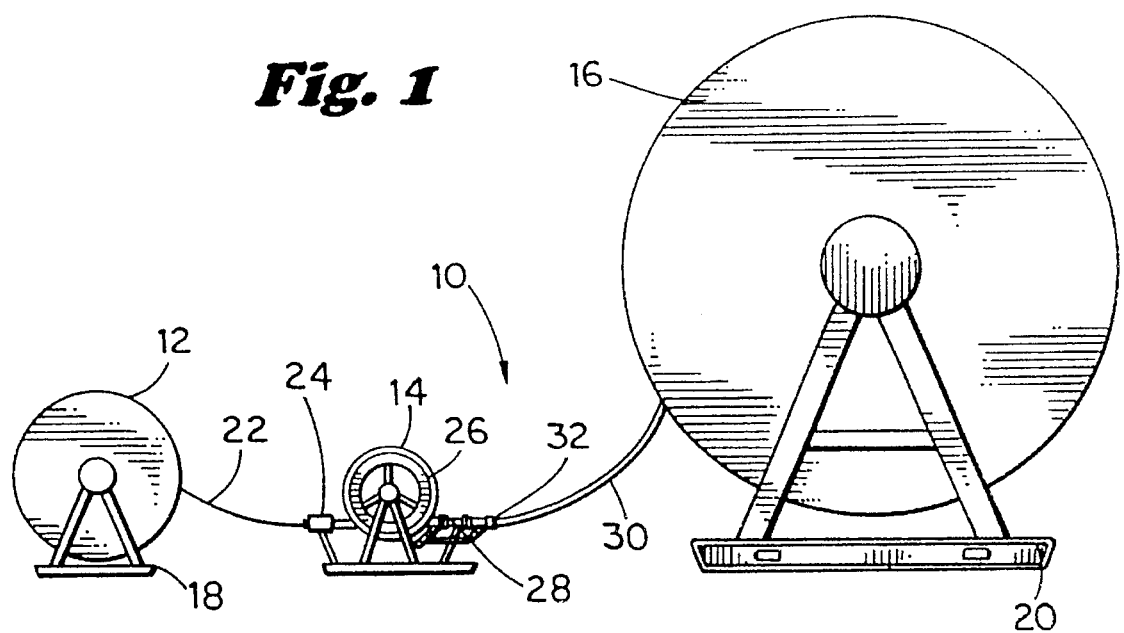
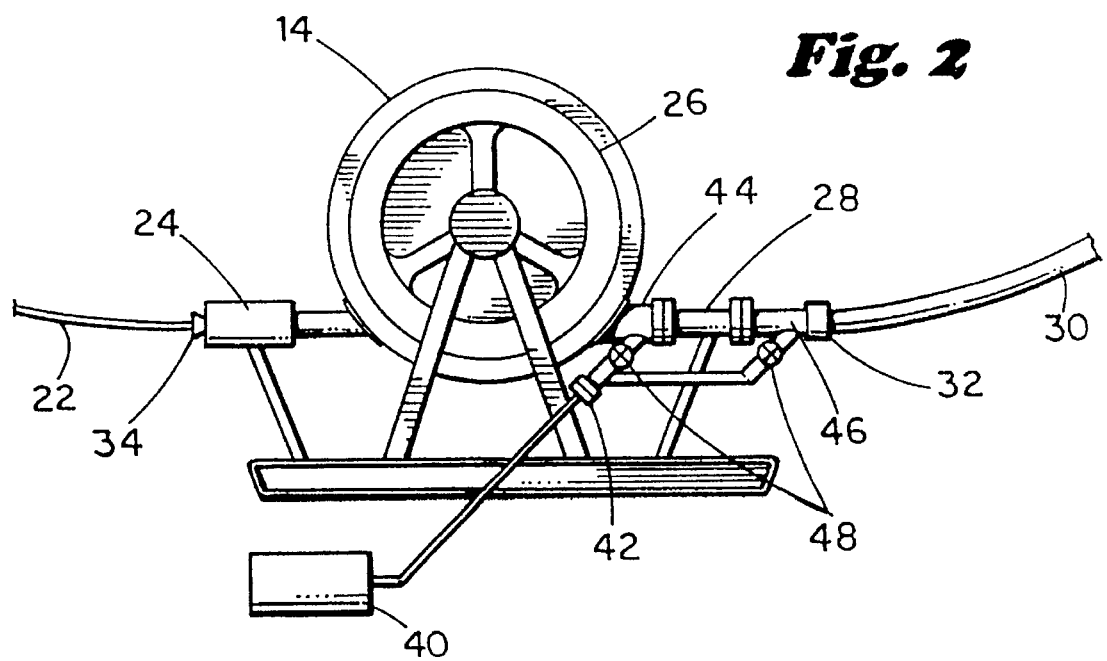

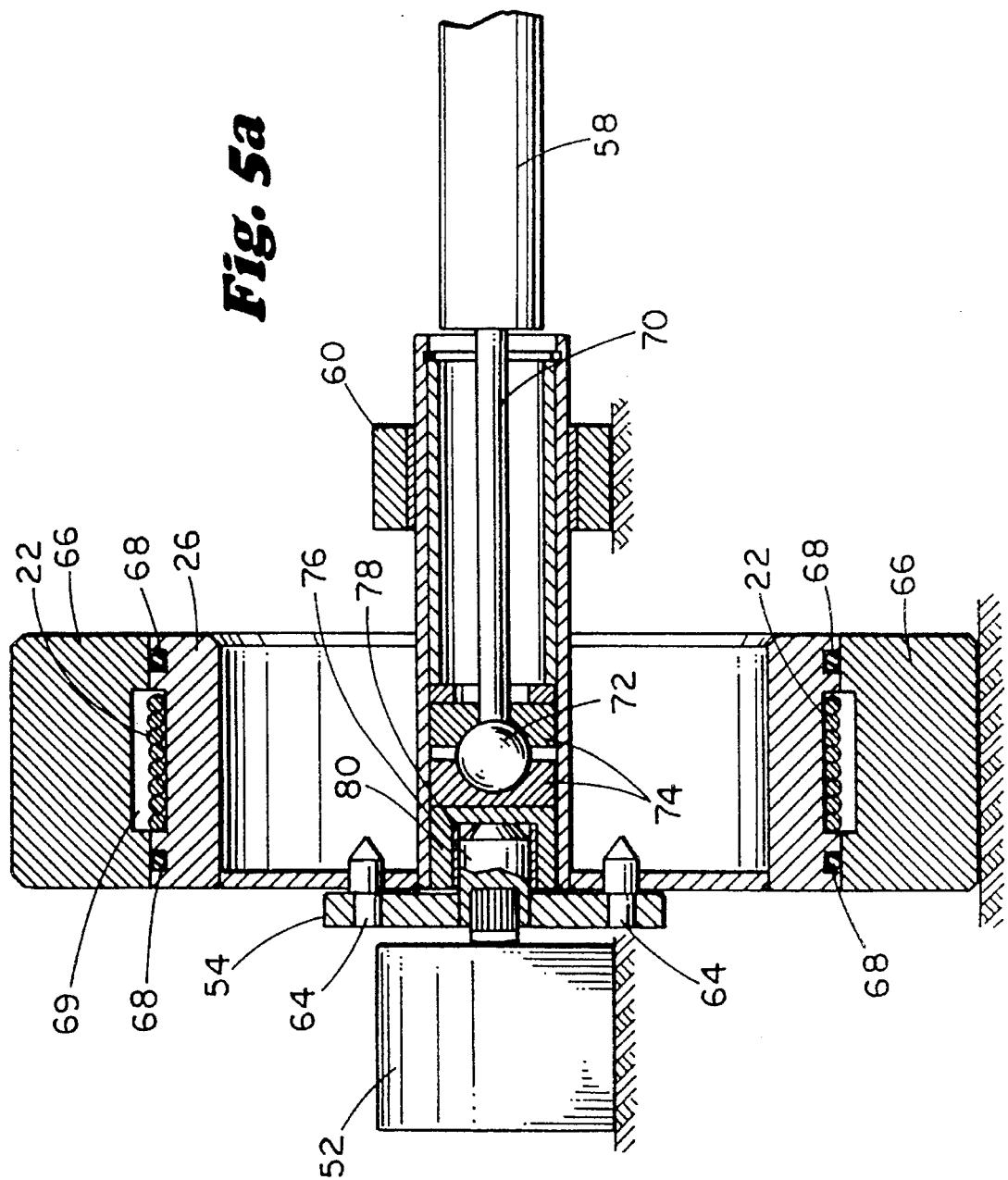

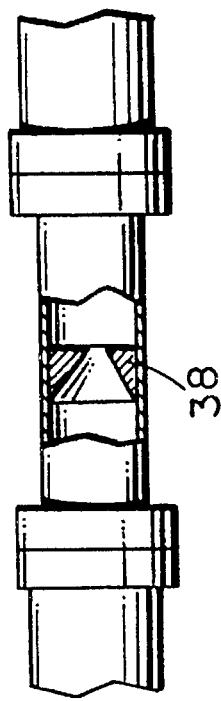
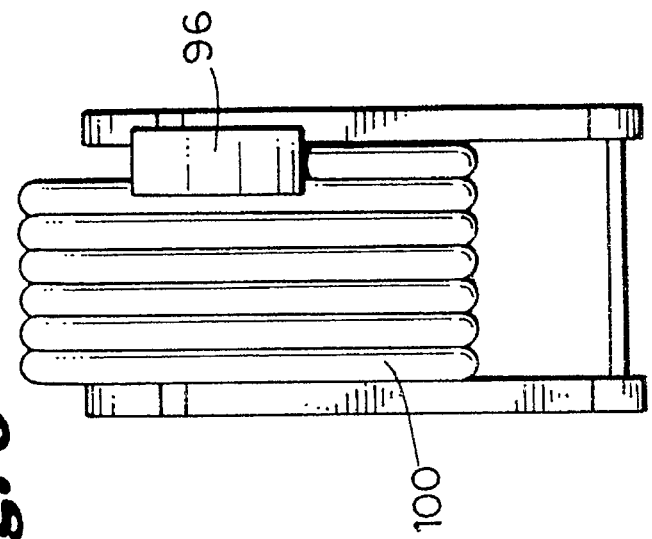
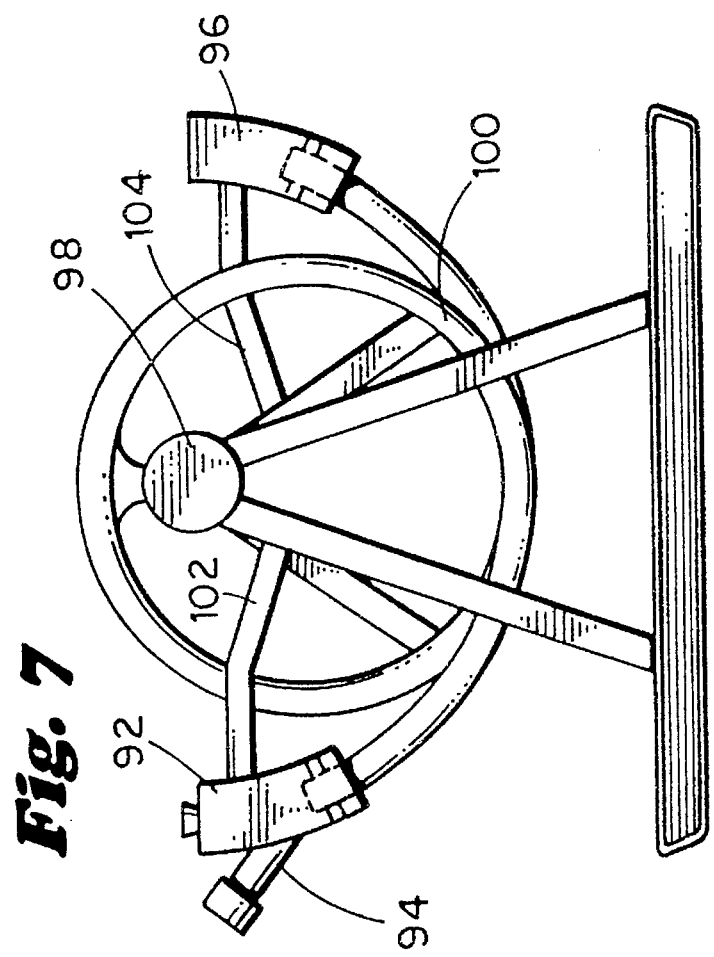

APPARATUS FOR THE INJECTION OF CABLE INTO COILED TUBING

This is a continuation-in-part of application Ser. No. 08/272,021, filed Jul. 8, 1994 now U.S. Pat. No. 5,503,370.

FIELD OF THE INVENTION

The present invention relates generally to the field of coiled tubing and, more particularly, to a method and apparatus for injecting cable into coiled tubing mounted upon a reel.

BACKGROUND OF THE INVENTION

Coiled tubing has proven its value and utility in a variety of applications, although a number of technological challenges remain. One such technological challenge involves the need for a technique for the injection of wire, cable, or small flexible tube into a reel of coiled tubing. As used herein, the term "cable" refers to all manner or wire or cable, now known or later developed, for the conduction of electromagnetic energy. The present invention is particularly adaptable but not limited to wireline applications.

In the past, cable has been installed on coiled tubing by first unreeling the coiled tubing from the reel and installing cable into the straightened tubing. There are two methods currently used for installing wire or cable into coiled tubing in this way. One method involves hanging the tubing from the reel into a well, dropping the cable into the tubing by gravity feed, and reeling in the tubing with the cable inside. The other method involves taking the coiled tubing to a long, unobstructed stretch of ground and stretching out 10,000–20,000 feet of coiled tubing. Then, a pig attached to the cable is inserted into the end of the tubing and is pumped through the tubing. Each of these methods costs about $20,000 to perform including the costs of work crews, but not including the costs of the materials.

In the past, experiments have been performed in which the goal was to prove the efficacy of pumping cable into a reel of coiled tubing. These experiments involved pumping water or other suitable fluid into a reel of coiled tubing to generate a flow of sufficient velocity through the tubing to drag the cable through.

The problem with pumping a cable in occurs at the pressure boundary. Movement of the cable through the pressure boundary is resisted primarily by the pressure differential between the pressurized reel and outside ambient pressure as well as friction forces at the stuffing box or seal where the cable enters the pressurized reel. Therefore, the total force to inject the cable equals the cross-sectional area of the cable times that pressure trying to push it back out plus the force necessary to overcome the friction resistance of the seal.

These experiments were partly successful in proving that cable could, indeed, be pumped into a reel but experienced several shortcomings. The major shortcoming of this method was that cable could only be pumped into the reel a relatively short distance. After a relatively short distance, the force necessary to assist the cable into the reel became too great. This is a major drawback since, to be worthwhile, the cable must be installed into the entire length of coiled tubing, often 10–20,000 feet.

On the other hand, one major success of these experiments was the proof that the cable could be removed from a reel of tubing using the pumping technique. This proof, however, did not solve the problem of installing cable into coiled tubing while it is still on the reel.

One proposed solution to the cable installation problem involved placing a set of rollers within the pressure chamber that included the coiled tubing. This proposed solution proved difficult to implement and caused damage to the cable due to the small area of contact of the rollers with the cable. This technique also was incapable of sensing when the cable stopped moving into the coiled tubing and therefore created kinking of the cable.

The recognition of the drawback of the rollers inside the pressure led to another possible solution that involved putting the entire spool of cable inside a pressure chamber. The pressure chamber was to be made from refuse pipeline of about 4 feet in diameter. This arrangement eliminated the difficulty of drawing the cable into the differential pressure and the seal since there was no need for a seal. The problems with this apparatus were the cost and controllability of cable insertion. Difficulty was expected in aligning the cable with the end of the coiled tubing and this technique proved unrealistically expensive to implement.

Thus, the solutions that have heretofore been proposed to solve the dilemma of installing cable into coiled tubing while it remains on the reel have all been less thorn satisfactory for one reason or another. Some such techniques have failed to install cable into sufficient length of tubing, some have offered significant promise but have proved impractical in application, while still others have caused damage to the cable or have been as expensive to implement as the old techniques that they were intended to replace. Therefore, there remains a need for a method and apparatus for the installation of cable into coiled tubing that is practical, effective, and yet cost effective.

SUMMARY OF THE INVENTION

The present invention solves these and other problems of the prior art by including a capstan within a pressure housing and may include a tensioning device downstream of the capstan to maintain a tractioning tension of the cable upon the capstan. From the capstan (or the tensioning device if needed), the cable is directed into a reel of coiled tubing. Placing a capstan within the pressure housing creates the necessary mechanical advantage to draw the cable into the pressure housing without damaging the cable and significantly reduces the size of the mechanism.

In a preferred embodiment, the tensioning device comprises a simple orifice plate through which the cable passes along with a flow of fluid. Alternatively, the tensioning device may comprise a mechanical tensioner, such as a set of rollers driven by, for example, a waterwheel-type device actuated by fluid flow. The orifice has a small clearance around the cable. The flowing fluid pulls the cable by differential pressure across the orifice plate to take the slack out of the cable on the capstan. If the cable stops moving into the reel of coiled tubing, the cable also stops moving through the tensioning device, forcing slack onto the capstan and the capstan stops gripping the cable. This acts as a passive sensing device or regulator to ensure smooth installation of the cable.

The rate of fluid flow through the orifice plate is controlled by piping connections upstream and downstream of the tensioning device and appropriate control valves on the piping connections.

To assist in the installation of the cable within the injector, the capstan is coupled to a hydraulic or manual retractor means. The capstan is withdrawn from within the pressure housing, the cable is placed within the housing for several loops of cable, and the capstan is put back within the housing. Alternatively, the cable may be fed into the stuffing box and guide channels direct the cable onto the capstan and from there to the initial tensioner (if included) or out of the injector.

Other objects and features of the present invention will be immediately apparent to those of skill in the art from a review of the following detailed description and the accompanying drawings.

BRIEF DESCRIPTION OF THE DRAWINGS

FIG. 1 is a schematic drawing of an overall system for the installation of cable into coiled tubing in accordance with the present invention.

FIG. 2 is a schematic drawing of a cable injector applicable to the system of FIG. 1.

FIG. 5a is a section view of a capstan that is a detail of the cable injector of FIG. 3.

FIG. 7 is a detail showing a side view of an oscillatory cable injector of FIG. 6.

FIG. 8 is an end view of the cable injector of FIG. 7.

FIG. 9 depicts details of an initial tensioner in a cable injector of the present invention.

DETAILED DESCRIPTION OF A PREFERRED EMBODIMENT

Figure 3:
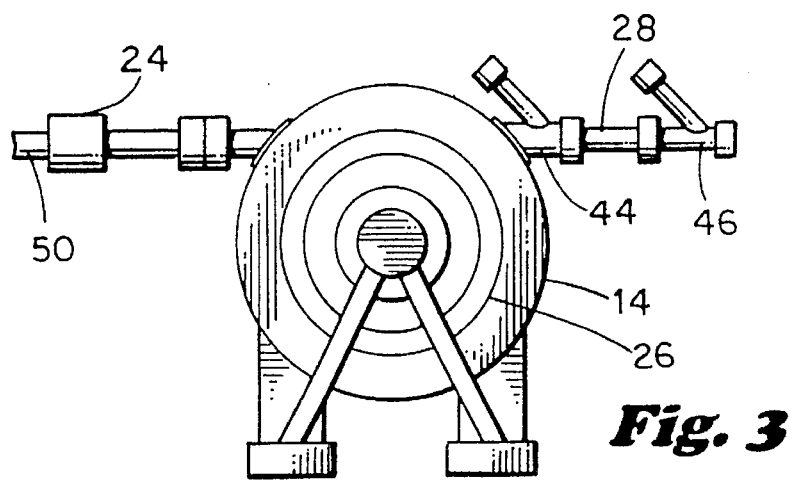
FIG. 3 is a side view of another preferred cable injector component.

FIG. 1 depicts a system, shown generally as 10, for the installation of cable according to the present invention. The system includes a cable reel 12, a cable injector 14, and a reel of coiled tubing 16. The cable reel is standard in the industry and is about 3–6 feet in diameter, depending upon the length and gauge of the cable. The cable reel is generally mounted on its own spooling stand 18.

The reel of coiled tubing 16 is also widely known in the art. The reel 16 is generally mounted on its own spooling stand 20 in a manner known in the art for transport to and from the field. The present invention is intended for adaptation to coiled tubing sizes from 1.5" to 2.875". It is, of course, equally adaptable to small and larger sizes of tubing.

The present invention resides in the cable injector 14. The cable injector 14 takes the cable, in whatever form, from the cable reel 12 and injects the cable into the coiled tubing on the reel 16. A cable 22 leaves the cable reel 12 and enters the cable injector 14 at a stuffing box 24. The stuffing box 24 seals the injector and coiled tubing with high pressure fluid, usually water or slick water, from outside ambient pressure. The cable then wraps around a capstan 26 that provides the motive force to draw the cable 22 into the injector 14 against the differential pressure between the injector and ambient, as well as the friction at the stuffing box 24. At design, the capstan is capable of running the cable into the coiled tubing at at least 150 feet per minute.

With properly functioning stuffing box seal and piping couplings, the present invention is leak proof, although a catch basin (not shown) may be used to eliminate any spillage of leaking fluids.

Downstream of the capstan 26 is an optional initial tensioner or flow nozzle 28. The cable is then injected into an end 30 of the coiled tubing at a tubing connector 32.

FIG. 2 provides more detail of the injector 14. In FIG. 2, the injector receives the cable 22 at a cable inlet 34 into the stuffing box. The cable then passes onto the capstan 26 where it wraps around the capstan a number of times, perhaps 3–5 times. The capstan 26 is enclosed within a pressure boundary formed by the injector 14. After the capstan the cable passes into an initial tensioner or flow nozzle 28. FIG. 9 depicts one such flow nozzle, in this case an orifice plate 38. The orifice plate provides a slight tension in the cable on the capstan due to the differential pressure, perhaps 30 psid, across the plate.

FIG. 2 also depicts flow couplings to the injector 14. A pump 40, for example a positive displacement pump, is connected to a flange 42 to provide high pressure fluid to the injector. The fluid provided by the pump 40 is divided between an inlet 44 and an outlet 46 to provide a differential pressure across the initial tensioner 28, if included. This differential pressure sets up the controlled flow that provides tension to the cable. The control is provided by a set of control valves 48 of the conventional type.

Figure 4:
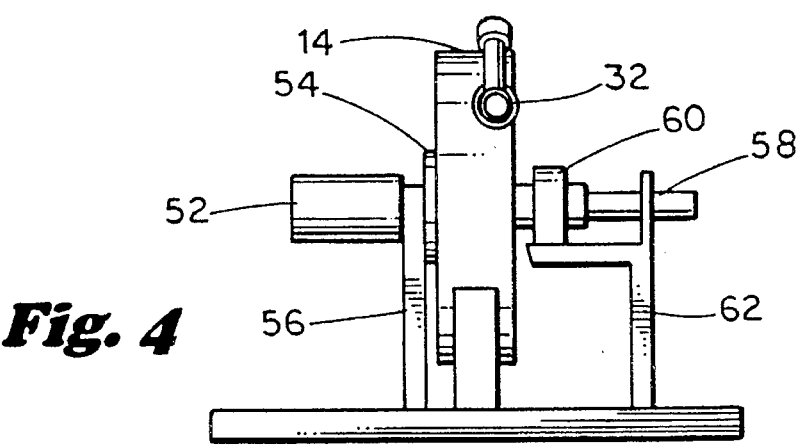
FIG. 4 is an end view of the preferred cable injector depicted in FIG. 2.

FIG. 2 depicts what may be referred to as a "bottom entry" injector system. Alternatively, FIGS. 3 and 4 depict a "top entry" injector system. More importantly, FIGS. 3 and 4, along with the section view of FIG. 5, depict a particular feature of the present invention that enables safe and easy installation of a cable onto the capstan.

Turning first to FIGS. 3 and 4, the stuffing box 24 accepts the cable (not shown) at an inlet 50. The cable wraps around the capstan 26 and is directed into a flow nozzle 28. FIG. 4 shows further details as viewed from the right side of the injector of FIG. 3. The tubing connector 32 couples the injector to the coiled tubing.

The injector 14 forms a pressure housing to seal the system at injection pressures, which may be as much as 5000 psi, for example. A prime mover 52 provides the drive for the capstan 26. The prime mover 52 may be an electric or hydraulic motor. The prime mover is coupled to a drive plate 54 and is supported by a pedestal mount 56. On the other side of the injector 14, a hydraulic actuator 58 is connected to the capstan through a bearing housing 60. The hydraulic actuator may be replaced with a manually operated actuator, if desired. The actuator permits retracting the capstan (with the system depressurized) from the injector 14 for the installation of the cable onto the capstan. The hydraulic actuator 58 and bearing housing is also mounted upon a pedestal mount 62.

Referring now to FIG. 5a, further details of the injector are depicted. As previously described, the prime mover 52 connects to the capstan 26 via the drive plate 54. The drive plate 54 releasably connects to the capstan through a set of drive pins 64. The drive pins 64 permit the capstan to slide off the drive mechanism for the insertion of the cable into the injector. The injector includes a pressure housing 66 that seals to the capstan 26 with one or more seals 68. The seals 68 seal off a pressure cavity 69 that holds the cable as it is wrapped on the capstan.

With the capstan 26 withdrawn from the pressure housing 66, cable is inserted into the stuffing box 24. Then, as more cable is fed into the injector, it is manually assisted around the interior cavity of the housing until a number of loops of cable have been inserted. Next, the cable is inserted into the inlet segment 44. Finally, the capstan is returned to within the pressure housing where the seals 68 seal the off the cavity 69.

The hydraulic (or manual) actuator 58 connects to the capstan 26 with a cylinder rod 70. The cylinder rod 70 delivers axial motion to the capstan through a ball connector 72 and ball sockets 74. A stabbing nose 76 rotates with the prime mover 52 within a bearing 78 and a socket 80. This entire structure allows the retraction of the capstan from the housing to expose the (depressurized) pressure cavity 69 for cable installation. This defines an additional feature of the present invention, that the capstan itself forms part of the pressure boundary for cable injection.

Figure 5B:
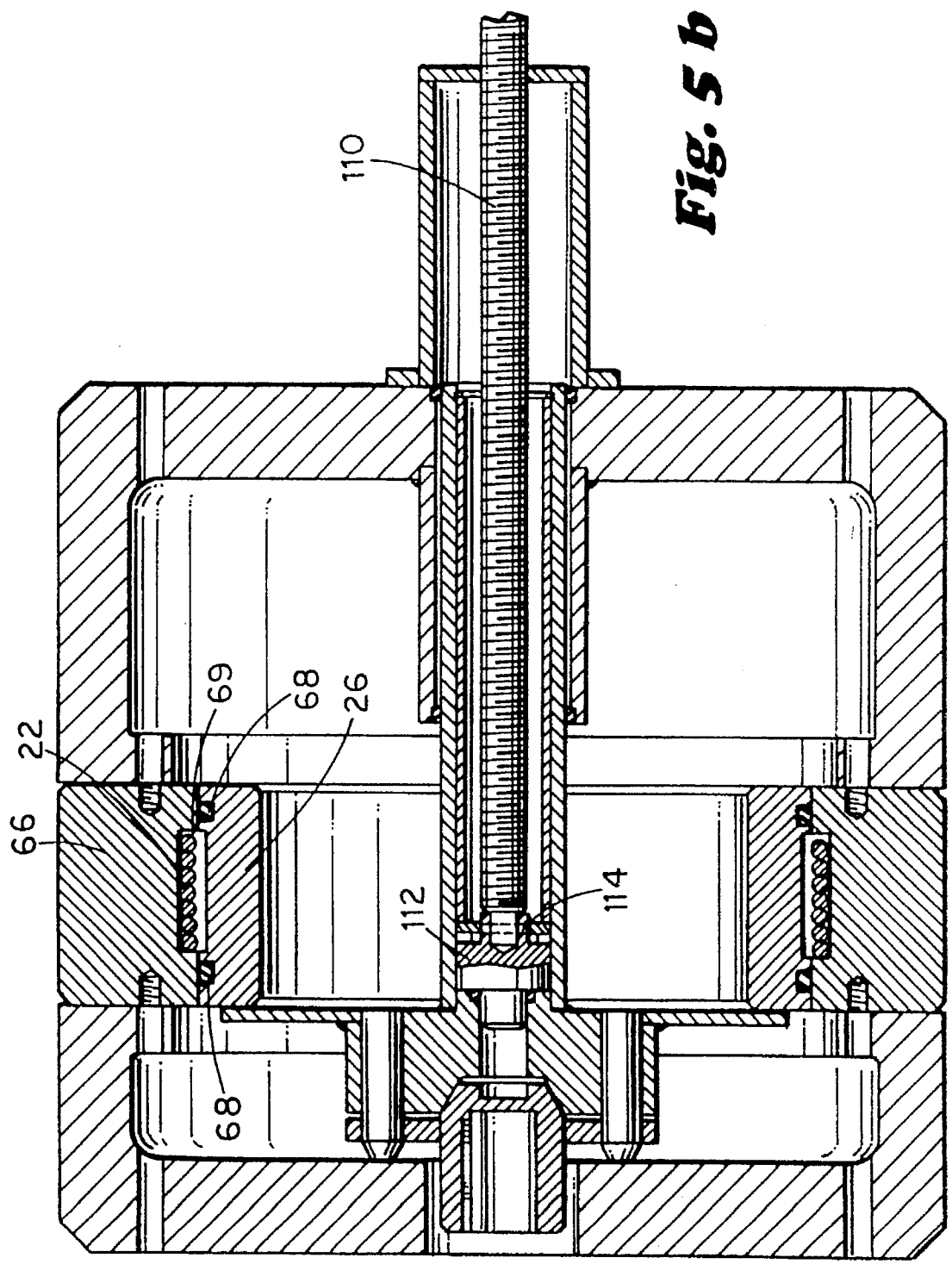
FIG. 5b is a section view of a preferred alternative embodiment of the capstan/pressure housing combination and associated components.

FIG. 5b depicts a section view of a preferred embodiment of a capstan within a pressure housing. In this case, a long threaded rod 110 permits manually cranking the capstan out of the pressure housing. The rod 110 is pinned to a coupling member 112 by a pin 114. The other end of the rod 110 is operated by a manual crank, handwheel, or the like, to withdraw the capstan 26 from the housing 66 and reinsert it. In FIG. 5b, the cable 22 is shown in the position it will be in after being inserted into the housing and after reinsertion of the capstan but before tensioning the cable onto the housing.

Figure 6:
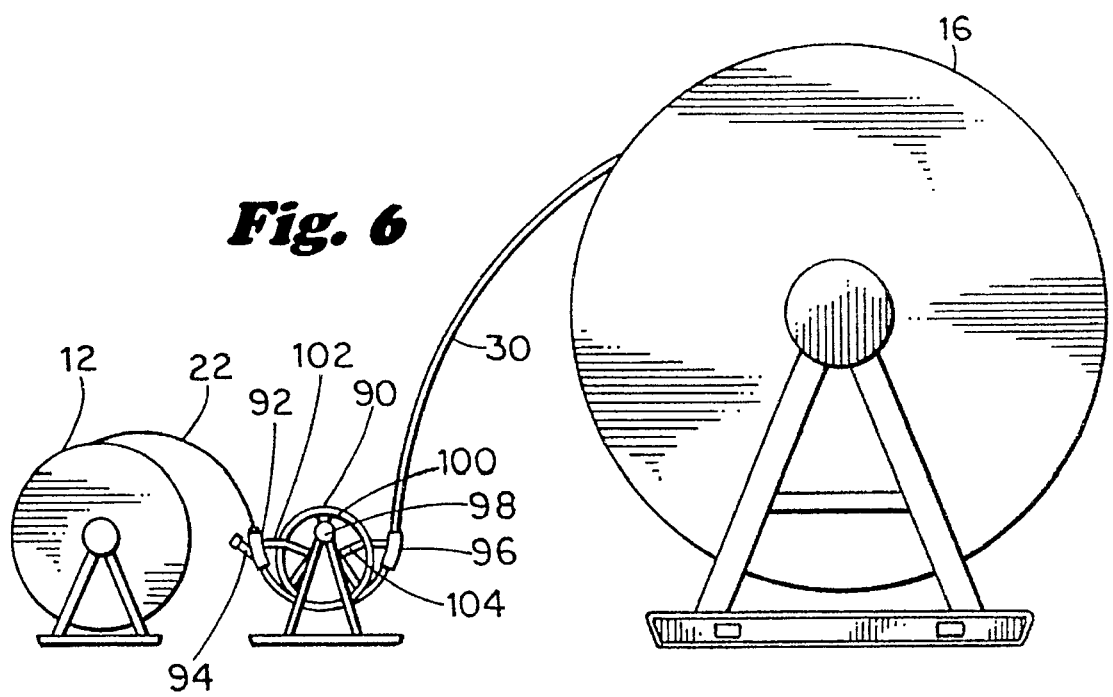
FIG. 6 is a schematic view of an overall system of another embodiment of the present invention.

FIGS. 6, 7, and 8 depict an alternative embodiment of the present invention. In FIG. 6, the cable reel 12 and reel of coiled tubing 16 are as before. In this case, however, a cable injector 90 comprises an eccentric, oscillating capstan, shown in greater detail in FIGS. 7 and 8. The cable 22 enters a stuffing box 92 that also includes a fluid injection coupling 94. A tubing connector 96 connects the injector 90 to the coiled tubing 30. A prime mover 98 provides oscillatory movement to the injector 90.

In this case, the capstan is one and the same with the pressure housing. As the cable coils through the capstan, it remains within a coiled housing 100. Fluid injected into the coupling 94, along with the friction of the stuffing box 92, acts like a brake so that, on the clockwise stroke, cable is held stationary while the coiled housing 100 slides into the stuffing box 92. During movement of the coiled housing 100, the stuffing box 92 and the tubing connector 96 remain stationary, held steady by brace members 102 and 104. Then, on the counterclockwise stroke, the capstan effect of the coiled housing 100 advances the cable forward out the tubing connector and into the coiled tubing. A seal 106 and a seal 108 seal either end of the coiled housing 100. The embodiment of FIGS. 6, 7, and 8 installs the cable in measured bites, unlike the continuous action of the previous description, but it has the advantage of significant simplicity. This embodiment also significantly reduces the size of high pressure seals that may require maintenance.

Figure 10:
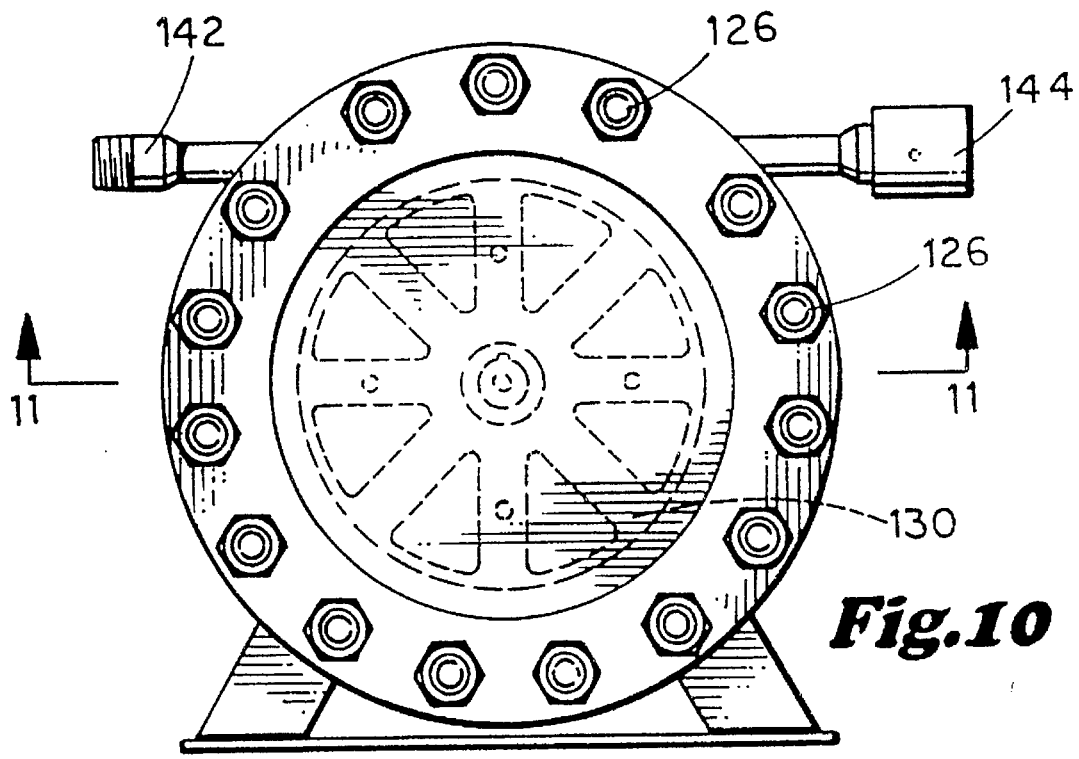
FIG. 10 depicts an elevation view of a presently preferred embodiment of the cable injector of the present invention.
Figure 11:
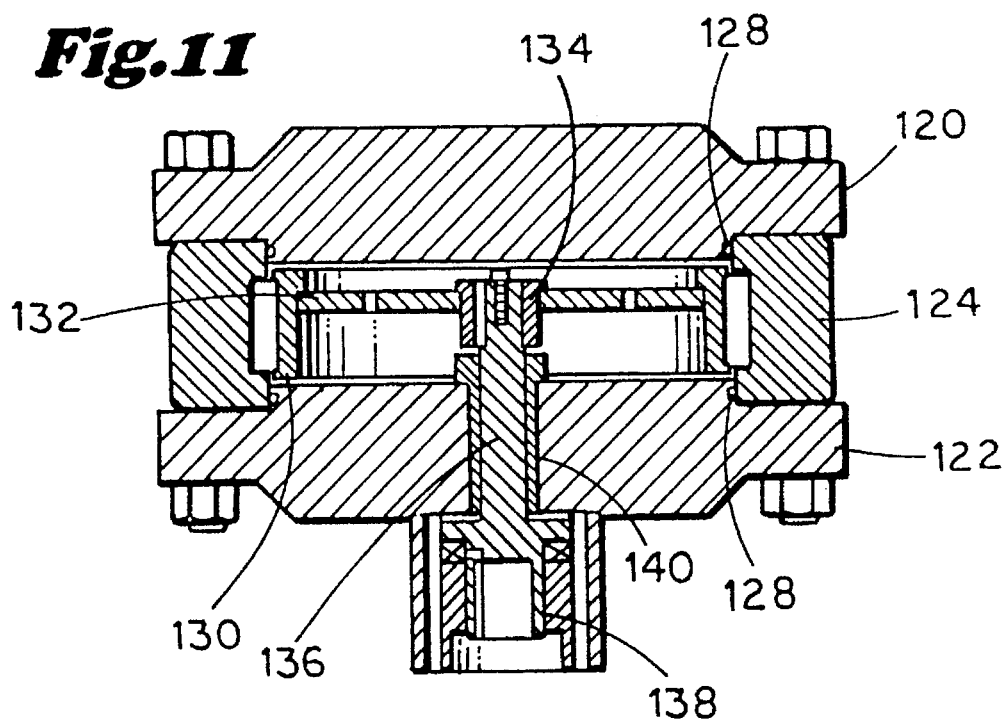
FIG. 11 depicts a section view of the embodiment of FIG. 10.

Referring now to FIGS. 10 and 11, a presently preferred embodiment of the present invention is disclosed. FIG. 10 depicts a side elevation view of the cable injector of the present invention and FIG. 11 depicts a section view taken along section A—A. In this embodiment, the pressure housing comprises a first seal plate 120, a second seal plate 122, and a housing ring 124. The plates 120 and 122 and the ring 124 are preferably held in sealing engagement by a plurality of heavy gauge bolts 126. A set of seal rings 128 seal the plates 120 and 122 with the ring 124.

In this embodiment, the drive mechanism is provided by a drive wheel 130 that is driven by a plurality of spokes 132 and mounted on a hub 134. The hub 134 detachably mounts to a drive shaft 136. The other end of the drive shaft 136 is adapted to mount to a prime mover at a drive spline 138. In a preferred embodiment, the prime mover comprises a hydraulic motor. The drive shaft 136 penetrates the seal plate 122 and rotates within a sleeve 140. Thus, this preferred embodiment significantly reduces the size of the rotating seal into the pressure chamber.

Those of skill in the art will recognize at least two distinctions of the embodiment of FIGS. 10 and 11. First, in this embodiment, the capstan or drive wheel does not form a part of the pressure barrier. This provides the advantage of reducing the size of the rotating seal, as just described. Further, the embodiment of FIGS. 10 and 11 does not include an initial tensioner 28. The embodiment of FIGS. 10 and 11 is certainly adapted to receive such an initial tensioner but, as previously described, this feature is optional.

To begin the cable installation process, the seal plate 122 is removed, leaving the drive wheel 130 free. Cable is inserted into a stuffing box 142 and pulled into the pressure housing. Several turns, for example 3–5 turns, of the cable are wrapped around the wheel 130. Then, cable is directed through a coiled tubing connector 144. Finally, the seal plate 122 is installed and the drive shaft 136 mated with the hub 134. The system is then ready to be pressurized and cable installed upon a reel of coiled tubing.

Figure 12:
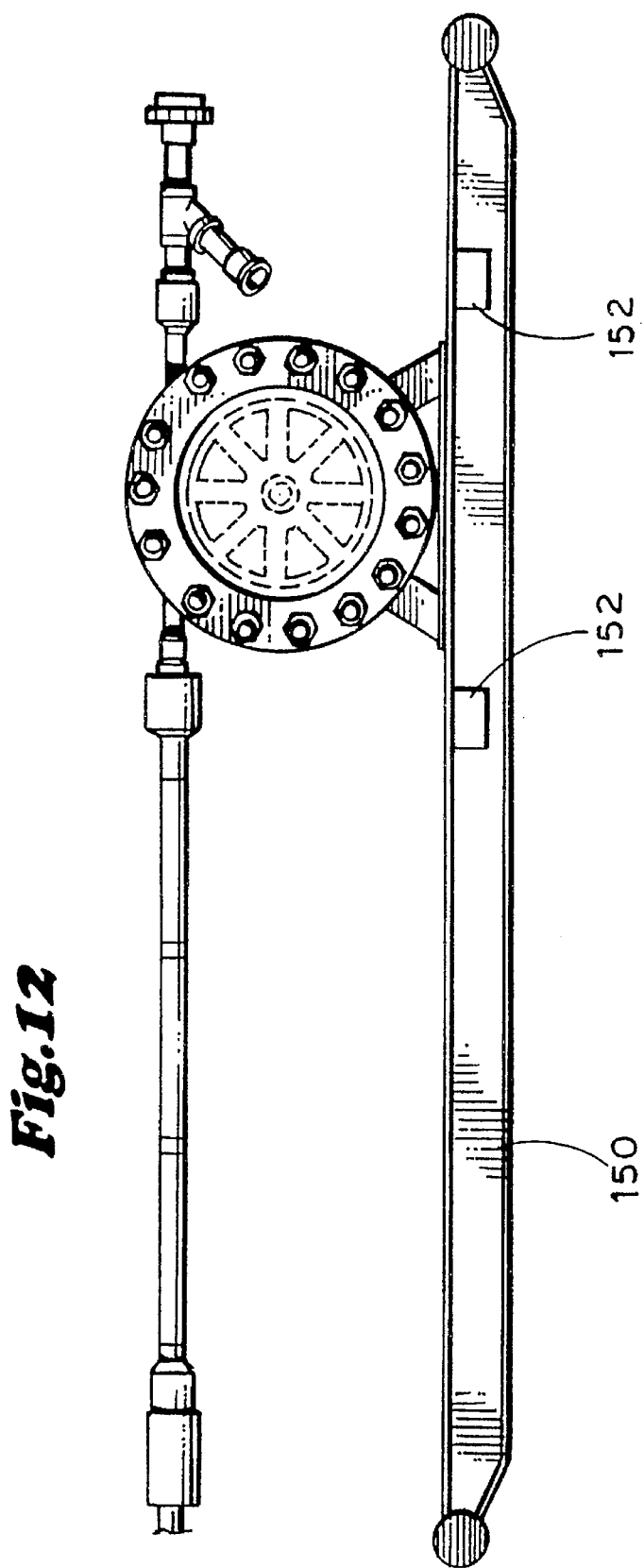
FIG. 12 depicts a skid mount for the presently preferred embodiment.

FIG. 12 depicts a preferred skid mount for the cable injector of the present invention. The mount includes a skid 150 with fork-lift mounts 152. The skid is preferably about 12 feet long, and the entire rig about 37" high with an injector reel about 30" in diameter.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A cable injector for the installation of cable into coiled tubing on a reel, comprising:
   a. a stuffing box for receiving cable from the source of cable and for providing a pressure boundary between ambient and the injector;
   b. a pressure housing coupled to the stuffing box, the pressure housing comprising first and second seal plates and a seal ring between the first and second seal plates;
   c. a drive wheel within the pressure housing upon which the cable is wound;
   d. a drive shaft through the second seal plate and detachably mounted to the drive wheel; and
   e. an outlet connector coupled to the pressure housing, the outlet connector adapted for connecting to coiled tubing on a reel.

2. The cable injector of claim 1 further comprising a skid upon which the housing is mounted.

3. A system for the installation of cable into coiled tubing on a reel, comprising:
   a. a source of cable;
   b. a cable injector, the injector comprising i. stuffing box for receiving cable from the source of cable and for providing a pressure boundary between ambient and the injector;

ii. a pressure housing coupled to the stuffing box, the pressure housing comprising first and second seal plates and a seal ring between the first and second seal plates;

iii. a drive wheel within the pressure housing upon which the cable is wound;

iv. a drive shaft through the second seal plate and detachably mounted to the drive wheel; and v. an outlet connector coupled to the pressure housing; and c. a reel of coiled tubing arranged to be connected to the outlet connector for receiving the cable from the pressure housing.

4. The system of claim 3 further comprising a skid upon which the housing is mounted.

5. The injector of claim 1 further comprising a prime mover to rotate the drive wheel.

6. The system of claim 3 further comprising a prime mover to rotate the drive wheel.

7. The injector of claim 1 further comprising an initial tensioner coupled to the pressure housing to provide tension to the cable on the capstan.

8. The system of claim 3 further comprising an initial tensioner coupled to the pressure housing to provide tension to the cable on the capstan.

9. The injector of claim 7 further comprising a source of pressurized fluid coupled to the injector and wherein the initial tensioner comprises an orifice plate with an orifice slightly larger than the cable to provide tension to the cable through differential pressure.

10. The system of claim 8 further comprising a source of pressurized fluid coupled to the injector and wherein the initial tensioner comprises an orifice plate with an orifice slightly larger than the cable to provide tension to the cable through differential pressure.

* * * * *